A. BLUM.
MANUFACTURE OF ZINC OXID.
APPLICATION FILED OCT. 17, 1910.
993,019.
Patented May 23, 1911.
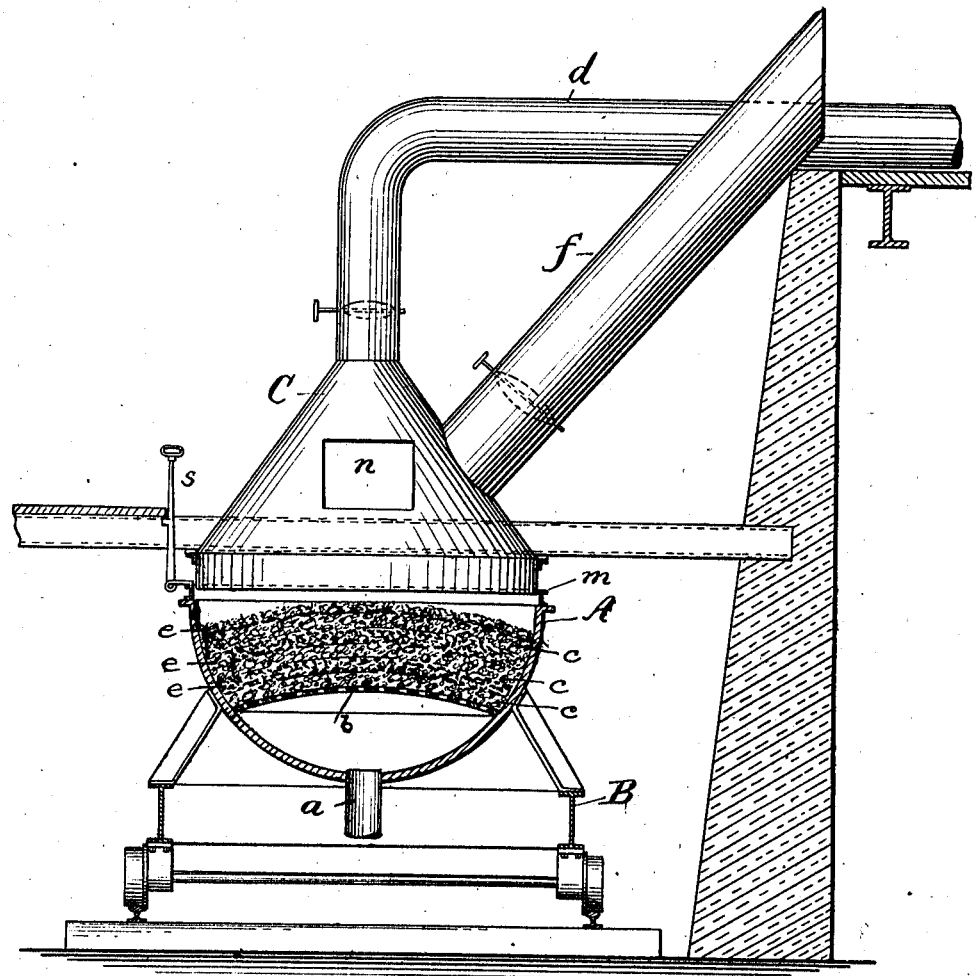
WITNESSES:
INVENTOR:
BY
ATTORNEYS

UNITED STATES PATENT OFFICE.

ABRAHAM BLUM, OF MONTEREY, MEXICO.

MANUFACTURE OF ZINC OXID.

993,019. Specification of Letters Patent. Patented May 23, 1911.

Application filed October 17, 1910. Serial No. 587,615.

*To all whom it may concern:*

Be it known that I, ABRAHAM BLUM, a citizen of the Republic of France, residing at and whose post-office address is Monterey, Nuevo León, Republic of Mexico, have invented certain new and useful Improvements in the Manufacture of Zinc Oxid; and I do hereby declare the following to be a full, clear, and exact description of the invention, such as will enable others skilled in the art to which it appertains to make and use the same.

My invention has for its object the production, directly from crude zinc ore of high or low grade, calcined zinc ore, or like zinkiferous material, of a high grade white oxid, carrying, in most instances, as high as 75 to 80% of zinc.

The fundamental or characteristic feature of the invention consists in making up the charge to be treated, of a plurality of layers of fuel, alternating with a plurality of layers of mixed fuel and zinc ore. The layers of fuel referred to constitute auxiliary heating zones intermediate of the layers of mixed fuel and ore. The layers of mixed fuel and ore constitute zones wherein the zinc ore is subjected by direct contact to the reducing action of the fuel forming a part of the mixture. The resultant effect is that the desired conditions for effectively reducing the ore and for oxidizing the zinc vapors produced to white oxid, are fully realized, while, at the same time, the total amount of zinc ore capable of being treated in a single charge is correspondingly multiplied.

In the Wetherill process for the production of white zinc oxid from the ore, ore mixed with coal is thrown upon a bed of burning coal spread out upon a special perforated grate, through which air is blown. The products of combustion, together with the zinc oxid, are drawn off from the furnace and the zinc oxid is filtered out in the bag room provided for the purpose. The capacity of the Wetherill furnace varies from about 120 to 150 kilos, and the furnaces are generally assembled in double groups of six. It takes from six to eight hours to burn a single charge; the furnace burns three charges a day and requires the same weight of coal and ore and needs three men per group. The Wetherill furnace is of the reverberatory type and is operated with a blast of from one to two ounces pressure. The low pressure of the blast prohibits the use of more than one layer of charge above the burning coal, because the slag incident to the operation so far reduces the pressure of the blast that the reduction of zinc ore in a second layer would not be possible. In the Wetherill process, therefore, as above noted, only a single layer of the zinc ore charge is treated, and it is necessary to clean the furnace grate at the termination of the operation and before the furnace is recharged. Consequently, the Wetherill furnace, although realizing a good recovery, is correspondingly expensive, because of the relatively small amount of ore which a single furnace can treat per day.

Experiments have also been made for the treatment of the residues of zinc smelters, by mixing said residues with 40% of coal and blowing the mixture, under high pressure, in a converter of the Huntington and Heberlein type. These experiments, however, have not, insofar as I am aware, resulted in a commercial process. The depth of the charge employed necessitates the employment of a blast of high pressure in order that the zinc may be extracted before the slag is formed. Furthermore, it is necessary to heat up the charge very quickly, otherwise the zinc oxid produced, coming in contact with the cold upper part of the charge, will remain therein in a crystallized condition and will not be volatilized again, so that the recovery is correspondingly poor. Moreover, the employment of a blast of high pressure produces furnace conditions which result in the reduction of the iron oxid contained in the ore. The iron is thereupon reoxidized and passes with the zinc oxid into the filter bags, making the zinc oxid yellow, and the zinc oxid itself is found to carry not more than 60% of zinc, in contradistinction to the much higher percentage of zinc carried by white oxid. Finally, because of the high temperature incident to the operation, it is difficult to treat a charge containing more than 400 kilos of ore. In the practice of my invention, on the contrary, it is entirely feasible to treat charges containing frome one to three tons of ore at a single operation, and in an ordinary conical pot or converter, having a perforated bottom. The alternate arrangement of the layers of coal, and of ore and coal mixed, as employed by me, permits the desired temperature conditions to be realized promptly throughout the charge, so that the reduction proceeds with corresponding uniformity. Crystallization of zinc oxid in the upper layers of the charge is avoided, and the pressure of the blast is restricted to such a range that the zinc oxid produced is not yellowed by the reduction of the iron oxid constituent of the ore and the reoxidation of the iron; and, instead of the highly liquid slag incident to the employment of excessive temperatures, a fairly porous cinder is produced which may be readily discharged from the converting vessel and which, during its formation, does not interfere with the conduct or progress of the operation.

In carrying out my invention, I may employ any suitable pot or converter, as, for instance, the well known Huntington and Heberlein converter. However, I have found particularly serviceable for the purpose an ordinary conical pot having a perforated false bottom. For instance, a converter actually used by me was of the conical type, one meter high and 1.20 meters in diameter at its upper edge. The opening for the entrance of the air blast, in the converter referred to, was 20 cm. and was below the false bottom, which, slightly curved or arched, had a diameter of 80 cm. with a series of perforations extending through it of about 11 mm. in diameter. The pot or converter was capped with an iron hood and connected with the bag house through a pipe line 40 cm. in diameter and 30 meters long. The bag house was connected with the pipe line through a fan and was provided with a settling chamber and the necessary cotton cloth filter bags. In using a pot or converter of this general character, I have found it suitable and desirable to employ layers of a thickness of 10 cm. in making up the charge, these layers being alternately anthracite coal and a mixture of anthracite coal and zinc ore. For instance, for the treatment of a zinc ore made up of Minas Viejas crude low grade fines, running 23% of zinc and 23% of iron, and free from lead and arsenic, I have employed a coal having volatile matter 7%; fixed carbon 86.8%, and ash 6.2%. In this particular instance, when a four-layer charge was employed, (i. e., a bottom layer of coal resting upon the perforated grate, a layer of mixed zinc ore and coal resting upon the bottom layer, a layer of coal resting upon the mixed ore and coal layer, and a top layer of mixed ore and coal) the entire charge contained 120 kilos of ore and 120 kilos of coal. 48 kilos of the coal was used in making up the layers of mixed ore and coal and may properly be designated as "reducing" coal. The remaining 72 kilos were used for the auxiliary heating layers and may be designated as "heating" coal. The ore was crushed to 6 mm., the "reducing" coal to 12 mm., and the "heating" coal to 25 mm. Each layer was of a thickness of 10 cm. The ignited charge was then blasted, beginning at a pressure of two inches, gradually rising to twelve inches as the operation progressed, and being again lowered somewhat. A good reaction was started after thirty minutes and the blast was continued for a period of six hours, the resulting product being a zinc oxid containing 76.5% of zinc. While good results can be thus obtained from the employment of four layers as described, I nevertheless prefer and recommend the employment of an additional layer of coal and an additional layer of mixed ore and coal, making six alternate layers of the same preferred thickness of 10 cm. In such case it will usually be preferable to continue the blow up to say seven hours, because of the greater amount of material treated and because the reaction does not seem to start as promptly. In general, it will not be found advisable to materially exceed this proposed maximum, for the reason that to do so would increase the duration of treatment of the charge and consequently there would be no saving in the capacity of the converter.

It will, of course, be understood that the example that I have above given from actual practice is but one illustration of the capacity and character of the invention. Even with the Minas Viejas low grade crude fines the process gave a product of good quality, although the crude ore contained as low as 23% of zinc and as high as 23% of iron, and although the converter employed was of a relatively moderate capacity. For larger industrial uses I recommend a pot or converter, say 75 cm. high and 2.10 meters inside diameter, which would be able to treat, under similar conditions of operation, three tons of ore in a single charge, or nine tons per day, an amount equal to the daily capacity of twenty Wetherill furnaces. So also, two converters, each having a capacity for treating nine tons of ore, i. e., a total capacity of eighteen tons, will require for their operation not more than five men, a saving of 50% of labor for equal capacity, as compared with the Wetherill furnace, twelve Wetherill furnaces requiring the services of three men to 5.4 tons of ore per day.

In the accompanying drawing, I have illustrated a suitable apparatus for the practice of my invention. The pot A, which may be supported in any convenient way, as, for instance, on the wheeled truck B, is provided with an air-blast pipe, a, and a perforated bottom b. Upon the perforated bottom are arranged the layers of heating coal c, alternating with the layers of mixed ore and reducing coal e.

C represents a collecting hood, having a pipe line *d* leading to the bag room, and a pipe *f* leading to the chimney, these pipes being severally provided with valves or dampers, for the purposes hereinbefore described. The hood may further be provided with a suitable number of closable charging openings, as *n*. A ring or annulus *m*, adapted to be raised or lowered by the handle *s*, serves to establish a sufficient connection between the pot A and the hood C.

It will, of course, be understood that I do not restrict myself to the employment of layers of coal, or of mixed coal and ore, of but 10 cm. thickness. They may materially exceed that thickness, or they may be of lesser thickness; but, in general, it will not be advisable to increase the thickness of any of the layers to exceed 20 cm. nor to have any of them of materially lesser thickness than 10 cm. In all cases, having in view the composition of the particular grade of ore treated, provision must be made to obtain the thermal effects desired in the heating zones or layers, and the corresponding reducing effects in the layers of mixed coal and ore, by making appropriate distribution of the coal employed; that is to say, by using coal layers of thickness sufficient to meet the requirements of the layers of mixed ore and coal, and by using an amount of reducing coal in the mixed layers suitable to the kind of ore under treatment. If lead is a constituent of the ore, the product will be a white zinc-lead pigment.

Before the starting up of the reaction the products of combustion, which always contain some free hydrocarbon, should be discharged through the furnace stack, without going to the bag room; otherwise there will result more or less yellowing of the zinc white oxid. But should the connection to the bag be made prematurely, any resultant yellowing of the product can be removed by subjecting it to heat in a muffle for a few minutes.

Having now described my invention, what I claim is:

1. The method of making zinc oxid from zinkiferous material, such as calcined zinc ore, crude zinc ore, and the like, which consists in establishing a charge made up of a plurality of layers of zinkiferous material mixed with crushed fuel for reduction, alternating with a plurality of layers of crushed fuel constituting auxiliary heating zones therefor, blasting the charge with air, and recovering the resultant zinc oxid fumes; substantially as described.

2. The method of making zinc oxid from zinkiferous material, such as calcined zinc ore, crude zinc ore, and the like, which consists in establishing a charge made up of a plurality of layers of the zinkiferous material mixed with fuel for reduction, alternating with a plurality of layers of fuel constituting auxiliary heating zones therefor, blasting the charge with air admitted during the earlier stage of the operation at relatively low pressure, subsequently at higher pressure, and finally at lower pressure, and recovering the resultant zinc oxid fumes; substantially as described.

3. The method of making zinc oxid from zinkiferous material, such as calcined zinc ore, crude zinc ore, and the like, which consists in establishing a charge made up of a plurality of layers of the zinkiferous material mixed with fuel for reduction, alternating with a plurality of layers of fuel constituting auxiliary heating zones therefor, air-blasting the charge at a temperature lower than the reducing point of any iron oxid present, and recovering the resultant zinc oxid fumes; substantially as described.

4. The method of making zinc oxid from zinkiferous material, such as calcined zinc ore, crude zinc ore, and the like, which consists in establishing a charge made up of a plurality of layers of the zinkiferous material mixed with fuel for reduction, alternating with a plurality of layers of fuel constituting auxiliary heating zones therefor; air-blasting the charge at a temperature to produce a cinder in contradistinction to a slag, and recovering the resultant zinc oxid fumes; substantially as described.

5. The method of making zinc oxid from zinkiferous material, such as calcined zinc ore, crude zinc ore, and the like, which consists in establishing a charge made up of a plurality of layers of the zinkiferous material mixed with fuel for reduction, alternating with a plurality of layers of fuel constituting auxiliary heating zones therefor, air-blasting the charge at a pressure whose maximum does not materially exceed twelve ounces, and recovering the resultant zinc oxid fumes; substantially as described.

6. The method of making zinc oxid from zinkiferous material, such as calcined zinc ore, crude zinc ore, and the like, which consists in establishing a charge made up of a plurality of layers of the zinkiferous material mixed with crushed fuel for reduction, alternating with a plurality of layers of crushed fuel constituting auxiliary heating zones therefor, the total amount of fuel present being approximately from forty to fifty per cent. by weight of the charge, air-blasting the charge, and recovering the resultant zinc oxid fumes; substantially as described.

7. The method of making zinc oxid from zinkiferous material, such as calcined zinc ore, crude zinc ore, and the like, which consists in establishing a charge made up of a plurality of layers of the zinkiferous material mixed with crushed fuel for reduction, alternating with a plurality of layers of crushed fuel constituting auxiliary heating zones therefor, the amount of fuel present in the layers of mixed fuel and ore being less than that present in the other layers, air-blasting the charge, and recovering the resultant zinc oxid fumes; substantially as described.

8. The method of making zinc oxid from zinkiferous material, such as calcined zinc ore, crude zinc ore, and the like, which consists in establishing a charge made up of a plurality of layers of the zinkiferous material mixed with crushed fuel for reduction, alternating with a plurality of layers of crushed fuel constituting auxiliary heating zones therefor, the layers of fuel being of substantially equal thickness with the layers of the mixture of fuel and zinkiferous material, air-blasting the charge, and recovering the resultant zinc oxid fumes; substantially as described.

9. The method of making zinc oxid from zinkiferous material, such as calcined zinc ore, crude zinc ore, and the like, which consists in establishing a charge made up of a plurality of layers of the zinkiferous material mixed with fuel for reduction, alternating with a plurality of layers of fuel constituting auxiliary heating zones therefor, the maximum number of layers being six and the layer thickness approximately ten centimeters; substantially as described.

In testimony whereof I affix my signature, in presence of two witnesses.

ABRAHAM BLUM.

Witnesses:
E. M. VILLAREAL,
J. C. ALLEN.

Copies of this patent may be obtained for five cents each, by addressing the "Commissioner of Patents, Washington, D. C."